United States Patent
Inoue et al.

(10) Patent No.: US 9,533,671 B2
(45) Date of Patent: Jan. 3, 2017

(54) VEHICLE CONTROL APPARATUS

(75) Inventors: Yuji Inoue, Nissin (JP); Yukihiko Ideshio, Nissin (JP); Shingo Eto, Gamagori (JP); Yousuke Michikoshi, Miyoshi (JP); Kenji Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/362,190

(22) PCT Filed: Nov. 16, 2011

(86) PCT No.: PCT/JP2011/006370
§ 371 (c)(1),
(2), (4) Date: Jun. 12, 2014

(87) PCT Pub. No.: WO2013/072960
PCT Pub. Date: May 23, 2013

(65) Prior Publication Data
US 2014/0342873 A1    Nov. 20, 2014

(51) Int. Cl.
| | |
|---|---|
| B60W 10/06 | (2006.01) |
| B60K 6/42 | (2007.10) |
| B60W 20/00 | (2016.01) |
| B60W 10/02 | (2006.01) |
| B60K 6/48 | (2007.10) |

(Continued)

(52) U.S. Cl.
CPC ............... *B60W 10/06* (2013.01); *B60K 6/42* (2013.01); *B60K 6/48* (2013.01); *B60K 6/547* (2013.01); *B60W 10/02* (2013.01); *B60W 10/08* (2013.01); *B60W 20/40* (2013.01); *B60K 2006/4825* (2013.01); *B60W 20/00* (2013.01); *B60W 2510/0275* (2013.01); *B60W 2710/083* (2013.01); *Y02T 10/6221* (2013.01);
(Continued)

(58) Field of Classification Search
None
See application file for complete search history.

(56) References Cited

U.S. PATENT DOCUMENTS

2007/0157899 A1* 7/2007 Seufert et al. ........... 123/179.25
2007/0227791 A1* 10/2007 Ueno .......................... 180/65.2
(Continued)

FOREIGN PATENT DOCUMENTS

| JP | 2010-111194 A | 5/2010 |
|---|---|---|
| JP | A-2010-201962 | 9/2010 |

*Primary Examiner* — Justin Holmes
*Assistant Examiner* — Timothy M Hannon
(74) *Attorney, Agent, or Firm* — Oliff PLC

(57) ABSTRACT

To provide a vehicle control apparatus which can suppress a shock in a clutch from being generated at a time of starting an engine by a motor in a vehicle having the clutch provided therein between the engine and the motor, thereby improving a drivability of the vehicle. Provided is a vehicle control apparatus, comprising: an engine, a motor generator connected to vehicle wheels of a vehicle, and a clutch that switches a transmission state between a disengaging state and an engaging state, in which the vehicle control apparatus switches the clutch in the engaging state to start the engine by the motor generator. When the engine is started by the motor generator, the vehicle control apparatus constantly keeps the compensation torque of the motor generator smaller than the clutch torque of the clutch.

7 Claims, 10 Drawing Sheets

(51) Int. Cl.
*B60K 6/547* (2007.10)
*B60W 10/08* (2006.01)

(52) U.S. Cl.
CPC ........ *Y02T 10/6252* (2013.01); *Y10S 903/902* (2013.01); *Y10T 477/26* (2015.01)

(56) References Cited

U.S. PATENT DOCUMENTS

2009/0312144 A1* 12/2009 Allgaier et al. .................. 477/5
2010/0250037 A1*  9/2010 Yoshida et al. ................ 701/22
2012/0316028 A1* 12/2012 Kobayashi et al. .............. 477/5

* cited by examiner

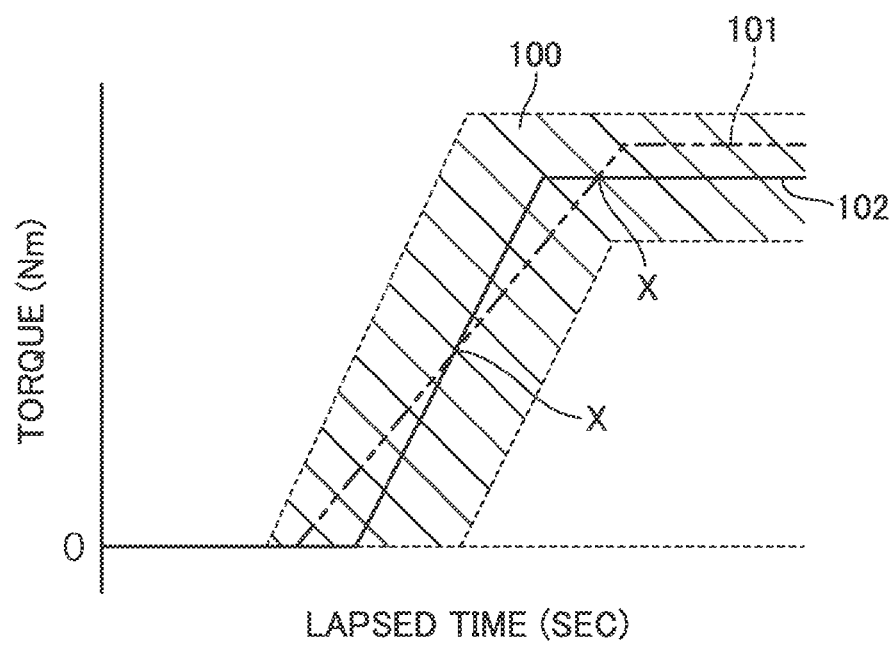

VEHICLE CONTROL APPARATUS

TECHNICAL FIELD

The present invention relates to a vehicle control apparatus.

BACKGROUND ART

In recent years, a hybrid vehicle is focused on as one type of vehicle of environment-friendly automobiles. The hybrid vehicle is generally provided, as power sources, with an internal combustion engine (hereinafter simply referred to as engine) powered by fuel such as gasoline or the like, and an electric motor (hereinafter simply referred to as motor) powered by electric power from a battery.

There is already developed an above mentioned type of a hybrid vehicle having mounted thereon a vehicle control apparatus comprising, for example, an engine, a motor, a clutch to engage or disengage the engine and the motor with each other, and a control unit (for example, refer to Patent Document 1). To start the engine of the type of the hybrid vehicle when the hybrid vehicle is being driven by the motor while the engine is not in operation, the vehicle control apparatus is adapted to engage a clutch to crank the engine by the motor.

To start the engine when the hybrid vehicle is being driven by the motor while the engine is not in operation, a torque that works as motor load is raised by the clutch being engaged to push-start the engine. For this reason, the rotational speed of the motor is sharply reduced even if the reduction is small, so that it is likely that there is generated a shock to prevent the vehicle from operating smoothly.

To suppress the vehicle from being prevented from operating smoothly by the shock, the control unit is adapted to calculate the amount of the load estimated to be increased in the motor by the push-start of the engine prior to engaging the clutch and to set the calculated amount of the load as a compensation torque of the motor. The control unit is further adapted to increase the output torque of the motor by the amount of the compensation torque at the timing of the engagement of the clutch. By the construction as set forth in above definition, generation of the shock due to the sharp increase of the motor load by the clutch being engaged is suppressed, thereby making it possible to start the engine while maintaining a smooth operation of the vehicle.

Meanwhile, as a result of diligent researches by inventors of the present invention, a fact was clarified that in this type of clutches there is some dispersion in property of each of clutches even among the clutches of the same kind due to errors in manufacturing and assembly by each of the clutches. To be more specific, as shown in a hatched region 100 in FIG. 10, there is some dispersion in timing of rise and amount in a torque at the engagement of each of the clutches (hereinafter simply referred to as clutch torque) even among the clutches of the same kind.

Within the dispersion range 100 of the clutch torque, each of the clutches takes its own unique rising line of the clutch torque 101. The rising line 101 of the clutch torque as shown in FIG. 10 is one example of the rising lines of clutch torque. Actually the rising line of the clutch torque is not limited to the rising line 101, but each of the clutches takes the rising line different from each other within the dispersion range 100 of the clutch torque.

CITATION LIST

Patent Literature

Patent Document 1: Japanese Patent Application Publication No. 2010-201962

SUMMARY

Technical Problem

However, in the conventional vehicle control apparatuses, the rising timing and the amount of the compensation torque with respect to the rising timing and the amount of the clutch torque are not taken into consideration at the time of performing torque compensation by the motor to have the clutch engaged to start the engine. For this reason, as shown in FIG. 10, in the conventional vehicle control apparatuses, the rising line 102 of the compensation torque comes over and under the actual rising line 101 of the clutch torque, so that the rising line 102 of the compensation torque and the rising line 101 of the clutch torque cross with each other.

At a crossing point X of the rising line 102 of the compensation torque and the rising line 101 of the clutch torque there is generated a shock in the clutch in response to a variation of torque in a power transmission system. Thus, there is a problem that the shock in the clutch is transmitted to the engine and the motor, so that there is finally generated the shock in the vehicle, thereby deteriorating a drivability of the vehicle.

The present invention has been made to overcome the previously mentioned conventional problems, and it is therefore an object of the present invention to provide a vehicle control apparatus which can suppress the shock in the clutch from being generated at the time of starting the engine by the motor in the vehicle having the clutch provided therein between the engine and the motor, thereby improving the drivability of the vehicle.

Solution to Problem

To achieve the above object, the vehicle control apparatus according to the present invention comprises: (1) an internal combustion engine, an electric motor connected with vehicle wheels, a clutch that switches a transmission state between a disengaging state where the internal combustion engine and the electric motor are disconnected from each other and an engaging state where the internal combustion engine and the electric motor are connected with each other, in which the internal combustion engine is started by the electric motor with the clutch being switched to the engaging state, and the electric motor has a compensation torque and the clutch has a clutch torque, the compensation torque being constantly kept smaller than the clutch torque, when the internal combustion engine is started by the electric motor.

In the present specification, the term "compensation torque" refers to a torque required to increase the output torque of the motor in order to compensate a load torque to be increased in the motor by having the clutch engaged to push-start the engine by the motor.

By the construction as set forth in the above definition, the compensation torque of the motor is constantly kept smaller than the clutch torque, when the engine is started by the motor. This means that, for example, as shown in FIG. 6A, the vehicle control apparatus according to the present invention performs control to increase the compensation torque at a timing later than the latest timing within the range of the clutch torque dispersion, and to control to constantly keep the compensation torque smaller than the range of the clutch torque dispersion.

By the construction as set forth in the above definition, the rising line of the clutch torque and the rising line of the compensation torque are prevented from crossing with each other. Therefore, the shock in the clutch of conventional vehicle control apparatuses due to the variation of torque direction in the power transmission system at the crossing point of the clutch torque and the compensation torque can be suppressed from being generated, thereby improving the drivability of the vehicle.

Moreover, because the compensation torque is kept constantly smaller than the clutch torque, power consumption of the battery can be suppressed, compared to a case in which the compensation toque is so large that the rising line of the clutch torque and the rising line of the compensation torque cross with each other, thereby making it possible to improve gasoline mileage. Further, because a residual capacity of battery can be preserved, a region in which an EV traveling is allowed in the hybrid vehicle can be increased.

To achieve the above object, the vehicle control apparatus according to the present invention comprises: (2) an internal combustion engine, an electric motor connected with the vehicle wheels, a clutch that switches a transmission state between a disengaging state where the internal combustion engine and the electric motor are disconnected from each other and an engaging state where the internal combustion engine and the electric motor are connected with each other, in which the internal combustion engine is started by the electric motor with the clutch being switched to the engaging state, and the electric motor has a compensation torque and the clutch has a clutch torque, the compensation torque being constantly kept larger than the clutch torque, when the internal combustion engine is started by the electric motor.

By the construction as set forth in the above definition, the compensation torque of the motor is constantly kept larger than the clutch torque, when the engine is started by the motor. This means that, for example, as shown in FIG. 9, the vehicle control apparatus according to the present invention performs control to increase the compensation torque at a timing earlier than the earliest timing within the range of the clutch torque dispersion, and to control to constantly keep the compensation torque larger than the range of the clutch torque dispersion.

By the construction as set forth in the above definition, the rising line of the clutch torque and the rising line of the compensation torque are prevented from crossing with each other. Therefore, the shock in the clutch of conventional vehicle control apparatus due to the variation of torque direction in the power transmission system at the crossing point of the clutch torque and the compensation torque can be suppressed from being generated, thereby improving the drivability of the vehicle.

Moreover, because the compensation torque is kept constantly larger than the clutch torque, the clutch is constantly generating the slip from the start of the engagement to the completion of the engagement. Accordingly, the vehicle control apparatus according to the present invention can suppress the motor rotational speed from being excessively decreased due to the output torque of the motor being absorbed by the engine, thereby making it possible to suppress the shock due to the absorption of the motor torque from being generated.

The vehicle control apparatus as set forth in above (1) or (2) may preferably be (3) further comprising a torque converter provided between the electric motor and the vehicle wheels, the torque converter having a lock-up clutch disposed therein, the vehicle control apparatus controlling the lock-up clutch to a slip side in a case that there is a large difference between the compensation torque of the electric motor and the clutch torque of the clutch.

In a case that the compensation torque and the clutch torque largely differ from each other, a large shock is likely to be generated in the clutch. Therefore, the large shock generated in the clutch is directly or indirectly transmitted to a drive shaft of vehicle wheels.

By the construction of the present invention, the vehicle control apparatus according to the present invention controls the lock-up clutch to a slip side in a case that the compensation torque and the clutch torque largely differ from each other, so that the shock in the clutch is intercepted at the lock-up clutch to be prevented from being directly transmitted to the drive shaft of the vehicle wheels, thereby making it possible to suppress the shock in the vehicle from being generated.

Further, particularly in a case where the compensation torque is constantly smaller than the clutch torque, the vehicle control apparatus according to the present invention can control the lock-up clutch to a slip side, so that the load of the motor in a downstream side of the lock-up clutch can be reduced. Thus, the compensation torque of the motor can be more sufficiently secured in the case where the compensation torque is constantly smaller than the clutch torque, compared to a case where the lock-up clutch is engaged. By this reason, the vehicle control apparatus according to the present invention can suppress the motor rotational speed from being excessively reduced due to the output torque of the motor being absorbed by the engine, so that the shock due to the absorption of the motor torque can be suppressed from being generated.

The vehicle control apparatus as set forth in above (3) may preferably be so constructed that (4) the vehicle control apparatus is operative to control the lock-up clutch to a slip side by delaying a time from a starting time of a slip of the lock-up clutch to a starting time of an engagement of the clutch.

By the construction as set forth in the above definition, the rotational speed of the motor can be increased in a long time before the clutch is engaged, so that the rotational speed of the motor is sufficiently large at the time when the clutch is started to be engaged. Therefore, even though the rotational speed of the motor is decreased when the clutch is afterwards engaged, the rotational speed of the motor sufficient to push-start the engine is secured. By this reason, the vehicle control apparatus according to the present invention can suppress the motor rotational speed from being excessively reduced, so that the shock due to the absorption of the motor torque can be suppressed from being generated.

The vehicle control apparatus as set forth in above (3) may preferably be so constructed (5) that the vehicle control apparatus is operative to control the lock-up clutch to the slip side by magnifying a slip amount of the lock-up clutch.

By the construction as set forth in the above definition, the vehicle control apparatus according to the present invention can increase a slip amount of the lock-up clutch, so that the lock-up clutch is controlled to set in the slip side, thereby the shock in the clutch is largely intercepted in the lock-up clutch. Thus, the shock in the clutch is prevented from being directly transmitted to the drive shaft of the vehicle, so that the shock in the vehicle can be suppressed from being generated.

Further, particularly in a case where the compensation torque is constantly smaller than the clutch torque, the vehicle control apparatus according to the present invention can control the lock-up clutch to the slip side more largely, so that the load of the motor in the downstream side of the lock-up clutch can be more largely reduced. Thus, the compensation torque of the motor can be more sufficiently secured in the case where the compensation torque is constantly smaller than the clutch torque, compared to the case where the lock-up clutch is engaged. By this reason, the vehicle control apparatus according to the present invention can suppress the motor rotational speed from being excessively reduced due to the output torque of the motor being absorbed by the engine, so that the shock due to the absorption of the motor torque can be suppressed from being generated.

The vehicle control apparatus as set forth in above (3) may preferably be so constructed that (6) the vehicle control apparatus is operative to control the lock-up clutch to the slip side by raising a rotational speed of the electric motor by the starting time of the engagement of the clutch, while preventing the time from the starting time of a slip of the lock-up clutch to the starting time of the engagement of the clutch from being delayed.

By the construction as set forth in the above definition, the rotational speed of the motor is sufficiently large at the time when the clutch is started to be engaged. Therefore, even though the rotational speed of the motor is decreased when the clutch is afterwards engaged, the rotational speed of the motor sufficient to push-start the engine is secured. By this reason, the vehicle control apparatus according to the present invention can suppress the motor rotational speed from being excessively reduced, so that the shock due to the absorption of the motor torque can be suppressed from being generated.

The vehicle control apparatus as set forth in above any one of (1) to (6) may preferably be so constructed that the vehicle control apparatus is operative to conduct a learning of a timing and a magnitude of a rise of the clutch torque of the clutch, and to approach the compensation torque of the electric motor to the clutch torque of the clutch in accordance with a result of the learning, when the internal combustion engine is started by the electric motor. By the construction as set forth in the above definition, the vehicle control apparatus according to the present invention can approach the compensation torque to the clutch torque, so that a torque difference is reduced, thereby making it possible to suppress the shock in the clutch from being generated.

Advantageous Effects of Invention

The present invention can provide a vehicle control apparatus which can suppress the shock in the clutch from being generated at the time of starting the engine by the motor in the vehicle having the clutch provided therein between the engine and the motor, thereby improving the drivability of the vehicle.

BRIEF DESCRIPTION OF DRAWINGS

FIG. 6 is a time chart showing a variation of the torque in the vehicle control apparatus according to the embodiment of the present invention, in a case that the compensation torque of the motor is constantly smaller than a dispersing range of the clutch torque, wherein FIG. 6A shows a case in which the torque dispersion range is larger before learning of the clutch torque, while

FIG. 10 is a time chart showing a variation of the torque in a conventional vehicle control apparatus, in a case that the compensation torque of the motor is within a range of the dispersion of the clutch torque.

DESCRIPTION OF EMBODIMENTS

Hereinafter, a preferable embodiment of the present invention will be explained with reference to accompanying drawings. The present embodiment is a case that the vehicle control apparatus according to the present invention is applied to a driving apparatus of a hybrid vehicle.

At first, the configuration of the driving apparatus will be explained.

Figure 1:
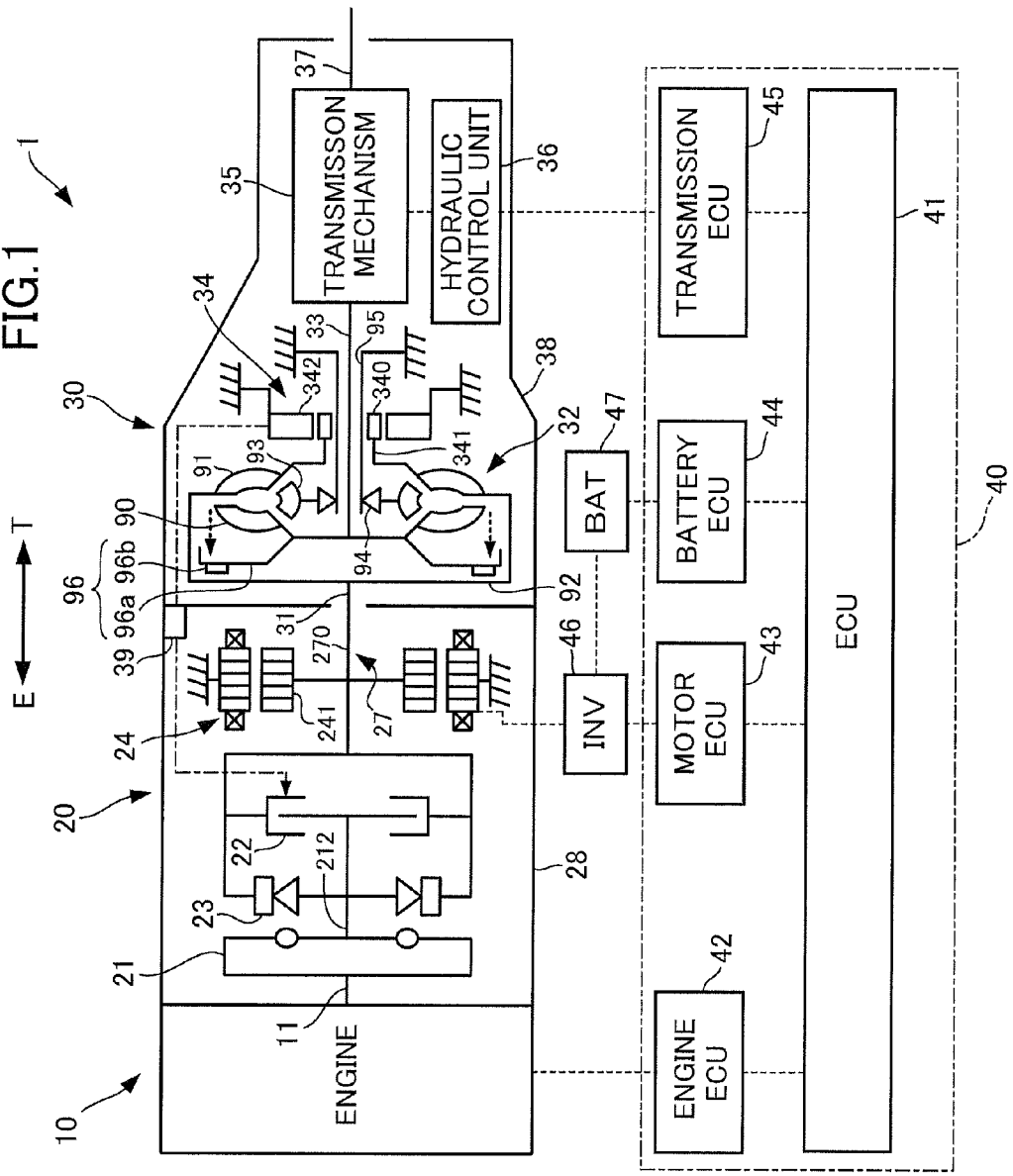
FIG. 1 is a skeleton diagram schematically showing a driving apparatus mounted thereon a vehicle control apparatus of an embodiment according to an embodiment of the present invention.

As shown in FIG. 1, a driving apparatus 1 provides an engine 10, a driving unit 20, an automatic transmission 30 and a control unit 40. In the present embodiment, an engine side E and an automatic transmission side T are defined as an engine 10 side of the driving apparatus 1 and an automatic transmission 30 side of the driving apparatus 1, respectively.

The engine 10 is constituted by a publicly known power unit which outputs driving force by combusting mixture gas of hydrocarbon fuel, such as gasoline and light oil and air in a combustion chamber not shown in FIG. 1. The engine 10 constitutes an internal combustion engine of the present invention. The engine 10 is adapted to reciprocate pistons not shown arranged inside a cylinder block also not shown by repeating a cycle of intake, combustion and exhaust in the combustion chamber, to rotate a crank shaft 11 connected to the pistons, thereby transmitting driving force. The engine 10 is thus adapted to transmit rotation torque from the crank shaft 11 to the driving unit 20.

The crank shaft 11 is provided with an engine rotational speed sensor 19. The engine rotational speed sensor 19 is adapted to detect a rotational speed of the crank shaft 11 and transmit a signal indicative of the rotational speed of the crank shaft 11 to the control unit 40. The engine rotational speed sensor 19 constitutes an internal combustion engine driving state detection unit. The engine rotational speed sensor 19 is adapted to detect the driving state of the engine 10.

Figure 2:
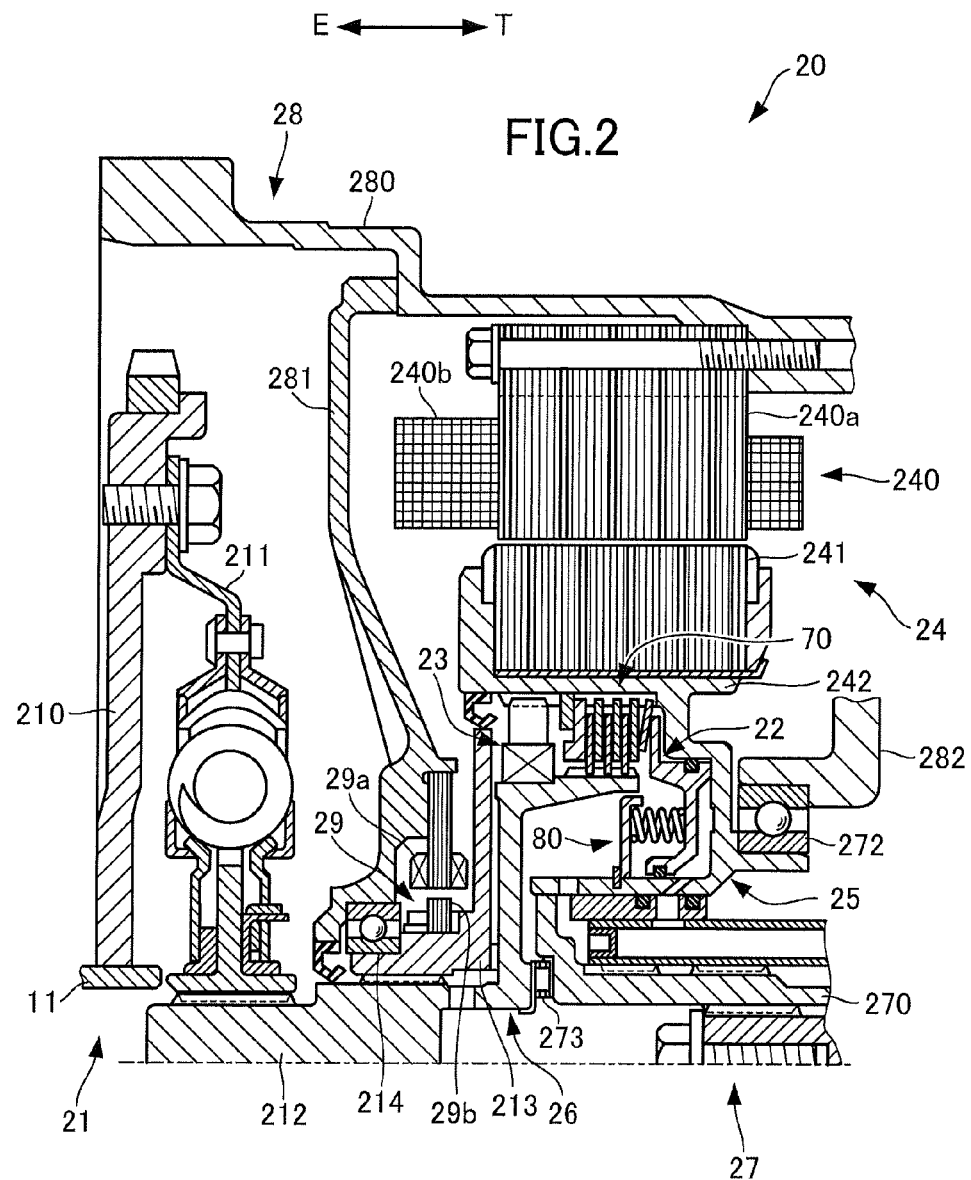
FIG. 2 is a block diagram showing a driving unit of the driving apparatus mounted thereon the vehicle control apparatus according to the embodiment of the present invention.
Figure 3:
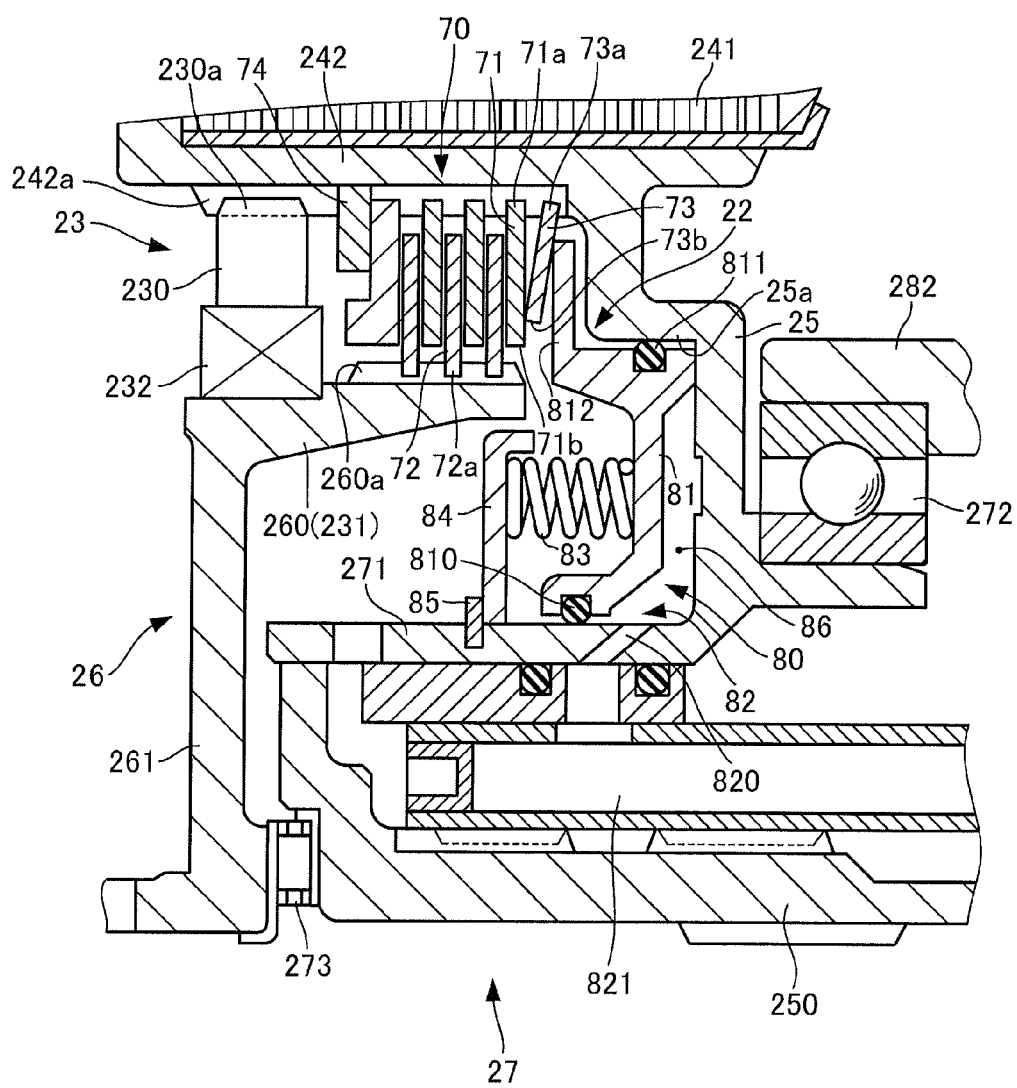
FIG. 3 is a block diagram showing a main part of the driving unit of the driving apparatus mounted thereon the vehicle control apparatus according to the embodiment of the present invention.

As shown in FIGS. 2 and 3, the driving unit 20 is comprised of an input portion 21, a clutch 22, a one-way clutch 23, a motor generator 24, a drum 25, a hub portion 26, an output portion 27 and a casing portion 28. The motor generator 24 constitutes an electric motor of the present invention. The driving unit 20 is arranged between the engine 10 and the automatic transmission 30, and is adapted to transmit the driving force outputted from the crank shaft 11 of the engine 10 to a transmission input shaft 31 of the automatic transmission 30 as explained hereinafter.

The input portion 21 has provided therein a flywheel 210, a damper 211, a clutch input shaft 212, a sleeve 213 and a bearing 214. The flywheel 210 is connected with the crank shaft 11 to be integrally rotatable with each other.

The damper 211 is connected with the flywheel 210 by a circumferential portion thereof to be integrally rotatable with each other. The damper 211 is connected with the clutch input shaft 212 in a central portion thereof to be integrally rotatable with each other. The damper 211 is adapted to absorb a rotational power between the flywheel 210 and the clutch input shaft 212.

The clutch input shaft 212 is coaxially provided with the crank shaft 11. The clutch input shaft 212 is connected with the clutch 22 and the one-way clutch 23 to be integrally rotatable with each other, thereby transmitting the driving force to the clutch 22 and the one-way clutch 23.

The sleeve 213 is attached in an outer circumferential portion of the clutch input shaft 212 to be integrally rotatable with each other. The bearing 214, which is constituted by a ball bearing, is secured in an outer circumferential potion of the sleeve 213.

The output portion 27 has provided therein a clutch output shaft 270, a sleeve 271, a bearing 272 and a thrust bearing 273.

The clutch output shaft 270 is coaxially arranged with the clutch input shaft 212. The clutch output shaft 270 is connected with the clutch 22 and the one-way clutch 23 to be integrally rotatable with each other, thereby transmitting the driving force of the clutch 22 and the one-way clutch 23 to an external unit. The clutch output shaft 270 is connected to the transmission input shaft 31 of the automatic transmission 30 to be integrally rotatable with each other, thereby transmitting the driving force outputted from the driving unit 20 to the automatic transmission 30.

The sleeve 271 is attached in an outer circumferential portion of the clutch output shaft 270 to be integrally rotatable with each other. The bearing 272, which is constituted by a ball bearing, is provided in the automatic transmission side T of the sleeve 271 to be integrally rotatable with the clutch output shaft 270. The thrust bearing 273 is provided between an end surface of the clutch input shaft 212 and an end surface of the clutch output shaft 270 which are held in face-to-face relationship with each other, to axially and relatively rotatably support the clutch input shaft 212 and the clutch output shaft 270.

The motor generator 24 has a stator 240, a rotor 241 and a rotor case 242 provided therein. The motor generator 24 is arranged on a driving force transmitting path between the crank shaft 11 and the transmission input shaft 31.

The stator 240 has a stator core 240a and a three-phase coil 240b wound by the stator core 240a provided therein. The stator core 240a, for example, is formed by laminated magnetic steel sheets, and is secured on the casing portion 28. The stator 240 is adapted to generate a rotating magnetic field by energizing the three-phase coil 240b.

The rotor 241 is arranged inside the stator 240 and has a plurality of permanent magnets embedded therein. The rotor case 242 has the rotor 241 accommodated therein. The rotor case 242, which is approximately in a tubular form, is provided in an outer circumferential side of the sleeve 271 forming a part of the output portion 27. The rotor case 242 has a spline 242a axially provided in an inner circumferential portion thereof.

The rotor case 242 has a motor rotational speed sensor 243 provided therein. The motor rotating speed sensor 243 is adapted to detect a rotational speed of the motor generator 24 through detecting a rotational speed of the rotor 241, and to input a signal indicative of the rotational speed of the motor generator 24 to the control unit 40.

The motor generator 24 is adapted to work as an electric motor for rotating the rotor 241 by a mutual action between a magnetic field generated by the permanent magnets embedded in the rotor 241 and a rotating magnetic filed generated by the three-phase coil 240b. The motor generator 24 is also adapted to work as a generator for generating electric power between both ends of the three-phase coil 240b by the mutual action between the magnetic field generated by the permanent magnets embedded in the rotor 241 and a rotation of the rotor 241.

The motor generator 24 is connected with an inverter 46. The inverter 46 is connected with a battery 47. By this configuration, the motor generator 24 and the battery 47 are adapted to exchange electric power between each other through the inverter 46. The battery 47 is adapted to charge or discharge electric power generated by the motor generator 24 in accordance with an operating condition of the hybrid vehicle.

An MG current sensor 461 is arranged on the power cable connecting the inverter 46 with the motor generator 24. The MG sensor 461 is adapted to detect a phase current and to input a signal indicative of the phase current to the control unit 40. A battery voltage sensor 471 is arranged between the output terminals of the battery 47. The battery voltage sensor 471 is adapted to detect the output voltage of the battery 47, and to input a signal indicative of the voltage to the control unit 40. A battery current sensor 472 is arranged on the output terminal of the battery 47. The battery current sensor 472 is adapted to detect a charge current and a discharge current of the battery 47, and to input a signal indicative of the charge current and the discharge current to the control unit 40. A battery temperature sensor 473 is mounted on the battery 47. The battery temperature sensor 473 is adapted to detect temperature of the battery 47, and to input a signal indicative of the temperature to the control unit 40.

The drum 25 connects the rotor case 242 and the sleeve 271 to have the rotor case 242 and the sleeve 271 integrated with each other. The drum 25 has a stepped portion 25a formed at a radially central portion thereof. The rotation of the rotor 241 is transmitted to the clutch output shaft 270 through the drum 25 and the sleeve 271.

The hub portion 26 has a hub body 260 and a hub support plate 261 provided therein.

The hub body 260, which is in a tubular shape, has a spline 260a axially provided in an outer circumferential portion thereof. The hub body 260 is held between the rotor case 242 and the sleeve 271. The support plate 261 connects an engine side E end portion of the hub body 260 and an automatic transmission side T end portion of the clutch input shaft 212, to have the hub body 260 and the clutch input shaft 212 integrated with each other.

The hub body 260 is connected with the crank shaft 11 through the hub support plate 261, the clutch input shaft 212, the damper 211 and the flywheel 210 to be integrally rotatable with the crank shaft 11. Oppositely, the rotation of the crank shaft 11 is transmitted to the hub body 260 through the flywheel 210, the damper 211, the clutch input shaft 212 and the hub support plate 261 in this sequence.

The clutch 22 has a multi-plate portion 70 and a piston portion 80 provided therein. The clutch 22 is arranged between the input portion 21 and the output portion 27. The clutch 22 is provided between the crank shaft 11 and the transmission input shaft 31, to be arranged to connect and disconnect the crank shaft 11 and the transmission input shaft 31. This means that the clutch 22 is adapted to switch the transmission state between the disengaging state in which the engine 10 is disconnected from the motor generator 24 and the engaging state in which the engine 10 is connected with the motor generator 24.

Figure 6A:
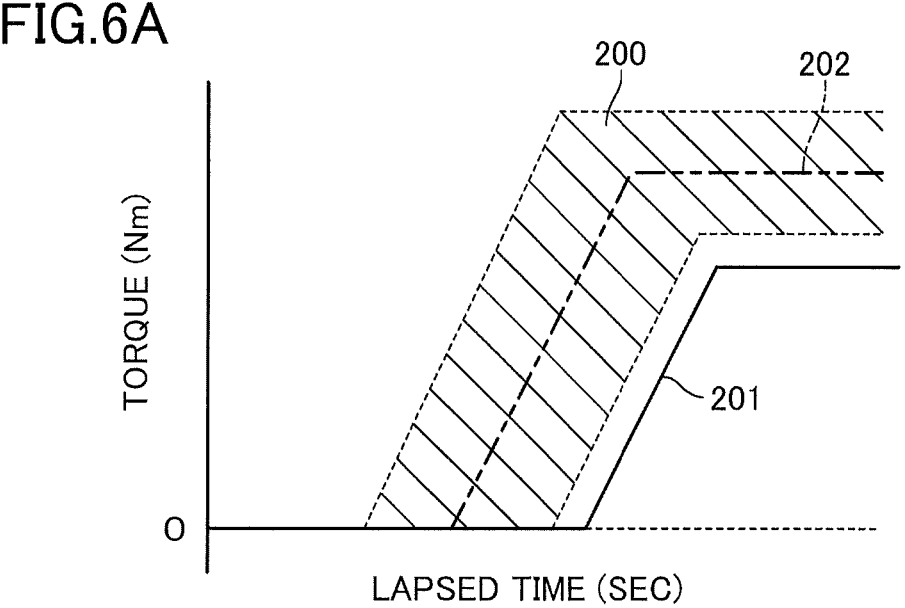

Further, the clutch 22 is set with the specifications of a rising timing and a magnitude of the clutch torque in design phase or in factory check phase. Here, in consideration of errors at mounting of the clutch 22 to a vehicle or the like, a dispersion range of the rising timing and the magnitude of the clutch torque 200 is preliminarily set, for example as shown in FIG. 6A.

The clutch 22 has an inner portion, all the time filled with hydraulic oil, provided therein. Therefore, the multi-plate portion 70 and the piston portion 80 are all the time immersed by the hydraulic oil. Particularly, in the disengaged state, the hydraulic oil is allowed to enter between each of separator plates 71 and a plurality of friction plates 72, hereinafter described, so that the hydraulic oil impregnates a surface of the separator plates 71 and the friction plates 72.

The clutch 22 is a normally-open type. The clutch 22 is normally in the disengaging state in which the engine 10 is disconnected from the motor generator 24. Further, the clutch 22 is operated by a high pressure hydraulic oil supplied from an oil pump 34 to have the engine 10 and the motor generator 24 connected with each other. The clutch 22 is arranged on an inner peripheral portion the motor generator 24.

The multi-plate portion 70 is provided between the rotor case 242 and the hub body 260. The multi-plate portion 70 has provided therein a plurality of separator plates 71, a plurality of friction plats 72, a cushion plate 73 and a snap ring 74.

The separator plate 71, which is in an annular shape, has a spline outer tooth 71a formed in an outer peripheral portion thereof and a penetrating bore 71b formed in an inner peripheral portion thereof. The spline outer tooth 71a is held in engagement with the spline 242a of the rotor case 242 to be axially and slidably provided.

The friction plate 72, which is in an annular shape, has a spline inner tooth 72a provided therein. The spline inner tooth 72a is held in engagement with the spline 260a of the hub body 260 to be axially and slidably provided.

The separator plate 71 and the friction plate 72 are provided to be adjacent to each other. The rotor case 242 and the hub portion 26 are fastened with each other, when the friction plate 72 and the separator plate 71 are axially pressed to mutually generate a friction in a rotational direction. On the other hand, the rotor case 242 and the hub portion 26 are released from being fastened with each other, when the friction plate 72 and the separator plate 71 are released from being axially pressed so that there is no friction generated.

The cushion plate 73, which is in an annular shape, has a spline outer tooth 73a formed in an outer peripheral portion thereof and a penetrating bore 73b formed in an inner peripheral portion thereof. The spline outer tooth 73a is held in engagement with the spline 242a of the rotor case 242 to be axially and slidably provided. The snap ring 74, which is in an annular shape, is held in engagement with the spline 242a of the rotor case 242, in the engine side E of all of the separator plates 71 and the friction plates 72.

The piston portion 80 is provided between the drum 25 and the multi-plate portion 70. The piston portion 80 has a piston 81, a hydraulic supply portion 82, a return spring 83, a support plate 84 and a stopper ring 85 provided therein.

The piston 81 is axially slidably provided between the sleeve 271 and the stepped portion 25a. The piston 81 has an inner O ring 810 and an outer O ring 811 and a pressing sub-portion 812 provided therein. The pressing sub-portion 812 is held in face-to-face relationship with the cushion plate 73, to press the cushion plate 73 in response to the piston 81 being slid toward the engine side E.

The hydraulic supply portion 82 has a hydraulic supply bore 820 and a hydraulic supply passage 821 provided therein. The hydraulic supply bore 820 is formed in the sleeve 271, to have a space 86, surrounded by the piston 81 and the drum 25, and a space in an inner peripheral portion of the sleeve 271 held in communication with each other. The hydraulic supply passage 821 has the hydraulic supply bore 820 and the oil pump 34 of the automatic transmission 30 held in communication with each other. The oil pump 34, which will be described hereinafter, is of a mechanical type.

In response to high pressure hydraulic oil being supplied to the space 86 surrounded by the piston 81 and the drum 25 through the hydraulic supply passage 821 and the hydraulic supply bore 820, the piston 81 is adapted to be slid toward the engine side E. In response to the piston 81 being moved toward the engine side E, the pressing sub-portion 812 is adapted to press the friction plate 72 and the separator plate 71 toward the engine side E through the cushion plate 73 to have the friction plate 72 and the separator plate 71 fastened to each other. In response to the friction plate 72 and the separator plate 71 being fastened to each other, the rotor 241 and the hub portion 26 are adapted to be integrally rotated.

The return spring 83, which is constituted by a number of compression coils provided in peripheral alignment with each other, is so provided to press the piston 81 from the engine side E toward the automatic transmission side T. The support plate 84, which is in an annular form, is adapted to support the engine side E of the return spring 83.

In response to a pressure of the hydraulic supply passage 821 being decreased to be smaller than an urging force of the return spring 83, the piston 81 is adapted to be slid towards the automatic transmission side T by operation of the return spring 83. In response to the piston 81 being slid towards the automatic transmission side T, the friction plate 72 and the separator plate 71 are released from being fastened with each other.

The one-way clutch 23 is provided between the rotor case 242 and the hub body 260. The one-way clutch 23 is provided between the crank shaft 11 and the transmission input shaft 31, to be connected with the crank shaft 11 and the transmission input shaft 31 so that only a rotational power in a positive rotational direction can be transmitted from the crank shaft 11 to the motor generator 24 through the transmission input shaft 31. Here, the positive rotational direction refers to a rotational direction of the crank shaft 11. Further the one-way clutch 23 is provided in an inner peripheral portion of the motor generator 24. The one-way clutch 23 is provided to be axially adjacent to the multi-plate portion 70 in the inner peripheral portion of the motor generator 24.

The one-way clutch 23 has an outer wheel portion 230, an inner wheel portion 231 and a rotation regulation portion 232 provided therein. The outer wheel portion 230 has a spline 230a axially provided in an outer peripheral portion thereof. The spline 230a of the outer wheel portion 230 is engaged with the spline 242a of the rotor case 242. The inner wheel portion 231 is doubled as by the hub body 260. The rotation regulation portion 232 is provided between the outer wheel portion 230 and the inner wheel portion 231. The rotation regulation portion 232 is adapted to allow the inner wheel 231 to be rotatable in the positive rotational direction with respect to the outer wheel portion 230.

The one-way clutch 23 is adapted to transmit the rotation of the crank shaft 11 to the clutch output shaft 270, when a rotational speed of the crank shaft 11 is higher than a rotational speed of the clutch output shaft 270. On the other hand, the one-way clutch 23 is adapted to suppress the transmission of the rotation of the crank shaft 11 to the clutch output shaft 270, so that the clutch output shaft 270 is allowed to rotate freely, when a rotational speed of the crank shaft 11 is lower than a rotational speed of the clutch output shaft 270.

The case portion 28 has a case body 280, an engine side rib 281 and an automatic transmission side rib 282 provided therein. The case body 280 accommodates therein the input portion 21, the clutch 22, the one-way clutch 23, the motor generator 24, the drum 25, the hub portion 26 and the output portion 27.

The engine side rib 281, which is in an annular shape having the clutch input shaft 212 formed at the center thereof, is provided in the engine side E of the motor generator 24, to be secured to the case body 280. In an inner peripheral portion of the engine side rib 281 is rotatably attached the sleeve 213 through the bearing 214 of the input portion 21.

Between the engine side rib 281 and the sleeve 213 is provided an input shaft rotational speed sensor 29. The input shaft rotational speed sensor 29 is adapted to detect the rotational speed of the clutch input shaft 212 and the hub portion 26 and to input a signal indicative of to the rotational speed thus detected to the control unit 40. The input shaft rotational speed sensor 29 in the present embodiment, which functions as a resolver, is provided with a sensor stator 29a attached to the engine side rib 281 and a sensor rotor 29b attached to the sleeve 213. However, the input shaft rotational sensor 29 according to the present invention may employ various kinds of sensors other than the resolver.

The automatic transmission side rib 282, which is in an annular shape having the clutch output shaft 270 formed at the center thereof, is provided in the transmission side T of the motor generator 24, to be secured to the case body 280. In an inner peripheral portion of the automatic transmission side rib 282 is rotatably attached the sleeve 271 through the bearing 272. Accordingly, the sleeve 271 and the clutch output shaft 270 are rotatably supported by the automatic transmission side rib 282.

As shown in FIG. 1, the automatic transmission 30 has the transmission input shaft 31, a torque converter 32, a transmission mechanism input shaft 33, an oil pump 34, a transmission mechanism 35, a hydraulic control unit 36, an output shaft 37 and a housing case 38. The automatic transmission 30 is connected with the motor generator 24.

The torque converter 32 is a hydraulic type applying circulating hydraulic oil, and is adapted to transmit the driving force outputted from the clutch output shaft 270 of the driving unit 20 to the transmission mechanism 35 through the transmission input shaft 33. The torque converter 32 has provided therein a turbine runner 90, a pump impeller 91, a front cover 92, a stator 93, a one-way clutch 94, a hollow shaft 95 and a lock-up clutch 96.

The turbine runner 90 and the pump impeller 91 are adapted to face each other to have the turbine runner 90 positioned in the engine side E. The turbine runner 90 is connected with the transmission mechanism input shaft 33 to be integrally rotated with the transmission mechanism input shaft 33. The pump impeller 91 is connected with the transmission input shaft 31 through the font cover 92 to be integrally rotated with the transmission input shaft 31. Inside the housing case 38 is supplied with the hydraulic oil.

The stator 93 is arranged in an inner peripheral side of a space between the turbine runner 90 and the pump impeller 91. The stator 93 is connected to the hollow shaft 95 through the one-way clutch 94. The hollow shaft 95, which is secured to the housing case 38, rotatably accomodates the transmission mechanism input shaft 33 inside thereof.

The lock-up clutch 96 has a lock-up piston 96a and a friction member 96b fixed on the lock-up piston 96a. The hydraulic oil flows toward the engine side E as shown by the arrow with dotted line in FIG. 1, when the rotational speed of the turbine runner 90 closes to the rotational speed of the pump impeller 91 as a vehicle speed exceeds a certain speed. In this case, the hydraulic oil moves the lock-up piston 96a toward the engine side E, and presses the friction member 96b against the front cover 92.

The lock-up clutch 96 is adapted to be switched to the engaging state by the lock-up piston 96a sliding toward the engine side E. In the engaging state, the friction member 96b is pressed against the front cover 92, so that the friction member 96b and the front cover 92 are connected with each other by friction, with the result that the front cover 92 is integrally rotated with the turbine runner 90. The lock-up clutch 96 is adapted to have the transmission input shaft 31 and the transmission mechanism input shaft 33 integrally rotated, so that there is not generated the slipping of the hydraulic oil, thereby making it possible to improve gasoline mileage.

The lock-up clutch 96 is adapted to be switched to the disengaging state in response to the lock-up piston 96a being slid toward the automatic transmission side T. In the disengaging state, the friction member 96b is spaced apart from the front cover 92, so that the friction member 96b and the front cover 92 are independently rotatable from each other. For this reason, the turbine runner 90 and the front cover 92 are independently rotatable from each other.

The oil pump 34 has a rotor 340, a hub 341 and a body 342 provided therein. The hub 341 has a cylindrical shape, and connects the rotor 340 with the pump impeller 91 so that the rotor 340 and the pump impeller 91 are integrally rotatable. The body 342 is secured to the housing case 38. By this construction, the driving force from the driving unit 20 is transmitted from the front cover 92 to the rotor 340 through the pump impeller 91, thereby making it possible to drive the oil pump 34.

The hydraulic oil discharged from the oil pump 34 is supplied not only to the transmission mechanism 35, but also to the clutch 22 in the driving unit 20 as shown by the chain line in FIG. 1. The oil pump 34 is adapted to supply the hydraulic oil to change a gear stage or a gear ratio of the transmission mechanism 35 and to engage the clutch 22.

Between the oil pump 34 and the clutch 22 is arranged a hydraulic pressure regulating valve 39. The hydraulic pressure regulating valve 39 is adapted to regulate an amount of hydraulic oil supplied from the oil pump 34 to the clutch 22 in accordance with a control signal from the control unit 40.

The oil pump 34 and the hydraulic pressure regulating valve 39 collectively constitute a clutch switching means. The oil pump 34 and the hydraulic pressure regulating valve 39 are adapted to switch the clutch 22 from the disconnecting state to the connecting state.

The transmission mechanism 35 has a plurality of clutches and brakes not shown provided therein. In the transmission mechanism 35, an optimum shift range is formed by switching between the engaging state and the disengaging state of a plurality of clutches and a plurality of brakes by the pressure of the hydraulic oil supplied from the hydraulic control unit 36 in accordance with running conditions of the hybrid vehicle. For example, a N (neutral) range, D (drive) range, R (reverse) range, M (manual) range (sequential range), 2 (second) range, L (low) range, B (brake) range, S (sport) range, and Ds (sport drive) range can be named as the shift ranges of the transmission mechanism 35.

The transmission mechanism 35 is connected with a shift lever 51 by which a driver of the vehicle changes gear stage. The shift lever 51 has a shift position sensor 52 mounted thereon. The shift position sensor 52 is adapted to detect a position of the shift lever 51 and to transmit a signal indicative of the shift position to the control unit 40.

The driving force outputted from the transmission mechanism input shaft 33 is transmitted to the output shaft 37 through the transmission mechanism 35 for driving the vehicle wheels through a differential gear not shown. This means that the motor generator 24 is connected with the vehicle wheels. The transmission mechanism 35 of the present embodiment is constituted as a multi-stage type, however the transmission mechanism of the vehicle having mounted thereon the vehicle control apparatus according to the present invention is not limited to the multi-stage type but may alternatively employ, for example, a continuous variable transmission mechanism.

Figure 4:
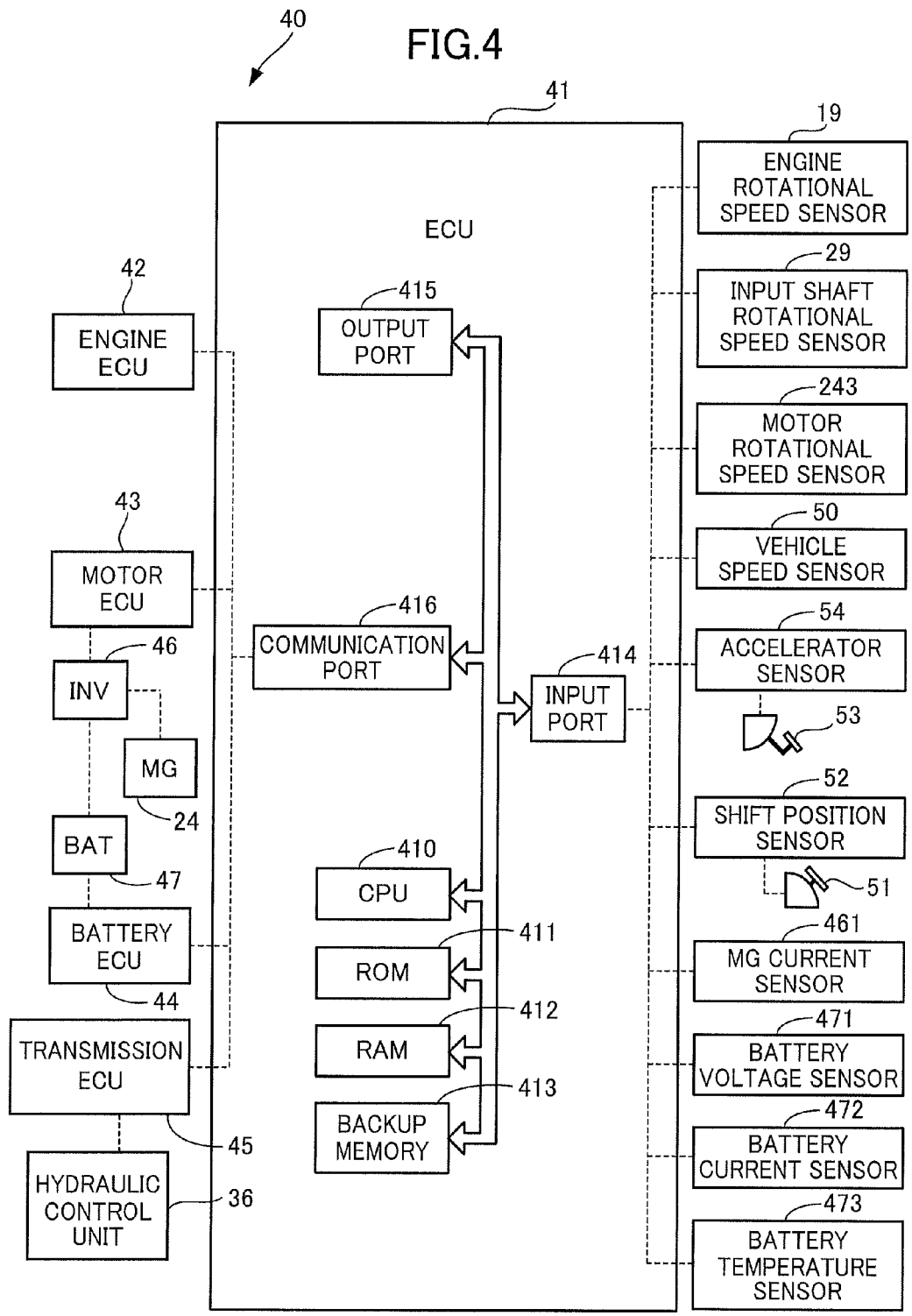
FIG. 4 is a block diagram showing a control unit of the vehicle control apparatus according to the embodiment of the present invention.

As shown in FIG. 4, the control unit 40 comprises a hybrid vehicle electronic control unit for the vehicle (hereinafter referred to as ECU) 41, an electronic control unit for the engine (hereinafter referred to as engine ECU) 42, an electronic control unit for the motor (hereinafter referred to as motor ECU) 43, an electronic control unit for the battery (hereinafter referred to as battery ECU) 44 and an electronic control unit for the transmission mechanism (hereinafter referred to as transmission ECU) 45. The control unit 40 constitutes a control means in the present invention.

The ECU 41 provides a CPU (Central Processing Unit) 410, a ROM (Read Only Memory) 411 for storing a processing program, a RAM (Random Access Memory) 412 for temporarily storing data, a back-up memory 413, an input port 414, an output port 415, and a communication port 416. The ECU 41 is adapted to supervise the control of the hybrid vehicle. The ECU 41 constitutes a clutch torque calculation means, a learning means and a clutch engagement start time setting means.

The input port 414 of the ECU 41 is connected with the engine rotational speed sensor 19, the input shaft rotational speed sensor 29, the motor rotation speed sensor 243, a vehicle speed sensor 50, an accelerator sensor 54, the shift position sensor 52, the MG current sensor 461, the battery voltage sensor 471, the battery current sensor 472, the battery temperature sensor 473, and the throttle opening degree sensor 173.

The vehicle speed sensor 50 is adapted to detect running speed of the vehicle and to transmit a signal indicative of the vehicle speed to the control unit 40. The accelerator sensor 54 is connected to an accelerator pedal 53. The accelerator sensor 54 is adapted to detect a depressed amount of the accelerator pedal 53, and to transmit a signal indicative of the depressed amount of the accelerator pedal 53 to the ECU 41. The ECU 41 is adapted to calculate an accelerator opening degree Acc based on the signal indicative of the depressed amount of the accelerator pedal 53 transmitted from the accelerator sensor 54.

The accelerator pedal 53 constitutes an internal combustion engine start request means. The accelerator pedal 53 is adapted to set an acceleration demand of a driver for the engine 10 by being depressed. The accelerator sensor 54 constitutes a start request detection means. The accelerator sensor 54 is adapted to detect that a start request is issued to the engine 10 in response to the accelerator pedal 53 being depressed.

The ECU 41 is connected with the engine ECU 42, the motor ECU 43, the battery ECU 44, and the transmission ECU 45 through the communication port 416. The ECU 41 is adapted to exchange various control signals and data with the engine ECU 42, the motor ECU 43, the battery ECU 44 and the transmission ECU 45.

The engine ECU 42 is connected with the engine 10 and the ECU 41. The engine ECU 42 is adapted to be inputted with signals from various sensors which detect the operating condition of the engine 10 and to control the engine 10 with the fuel injection control, the ignition control, the air suction control and the like in accordance with the signals inputted.

The engine ECU 42 is adapted to communicate with the ECU 41. The engine ECU 42 is adapted to control the engine with the control signals from the ECU 41, and to transmit data indicative of operating condition of the engine 10 to the ECU 41 when required.

The motor ECU 43 is connected with the inverter 46 and the ECU 41. The motor ECU 43 is adapted to control the motor generator 24. The motor ECU 43 is adapted to be inputted with signals necessary for controlling the motor generator 24. The signals necessary for controlling the motor generator 24 include a signal from the motor rotational speed sensor 243 mounted on the motor generator 24, a signal detected by the MG current sensor 461 indicative of the phase current flowing through the motor generator 24 and the like. The motor ECU 43 is adapted to output switching signal to the inverter 46.

The motor ECU 43 is adapted to communicate with the ECU 41. The motor ECU 43 is adapted to regulate a speed and a torque of the motor generator 24 by controlling the inverter 46 in accordance with control signals from the ECU 41. The motor ECU 43 is adapted to transmit data indicative of the operating condition of the motor generator 24 to the ECU 41 as necessary.

The battery ECU 44 is connected with the battery 47 and the ECU 41. The battery ECU 44 regulates the battery 47. The battery ECU 44 is adapted to be inputted with signals necessary for regulating the battery 47. For example, signals necessary for regulating the battery 47 include a signal indicative of the terminal voltage from the battery voltage sensor 471, a signal indicative of charge-discharge current from the battery current sensor 472 and a signal indicative of battery temperature from the battery temperature sensor 473 and the like.

The battery ECU 44 is adapted to communicate with the ECU 41. The battery ECU 44 is adapted to transmit data indicative of operating condition of the battery 47 to the ECU 41 as necessary. The battery ECU 44 is adapted to calculate a state of charge (hereinafter simply referred to as SOC) of the battery 47 for regulating the battery based on the accumulated value of charge-discharge current detected by the battery current sensor 472.

The transmission ECU 45 is connected with the automatic transmission 30 and the ECU 41. The transmission ECU 45 is adapted to control the lock-up clutch 96 of the torque converter 32, and to select the gear stage of the transmission mechanism 35.

The transmission ECU 45 is adapted to communicate with the ECU 41. The transmission ECU 45 is adapted to perform the shift control to select the gear stage of the transmission mechanism 35 in accordance with the signal from the ECU 41. The transmission ECU 45 is adapted to transmit data indicative of the operating condition of the transmission mechanism 35 and the torque converter 32 to the ECU 41 as necessary.

The engine 10, the motor generator 24 and the clutch 22 as mentioned above collectively constitute the vehicle control apparatus according to the present invention which has the clutch 22 take the engaging state, so that the engine 10 is started by the motor generator 24. In the vehicle control apparatus according to the present invention, the compensation torque of the motor generator 24 is constantly kept smaller than the clutch torque of the clutch 22, when the engine 10 is started by the motor generator 24.

Further, the vehicle control apparatus according to the present invention comprises the clutch torque calculation means to calculate the clutch torque of the clutch 22, the internal combustion engine start instruction means to issue the engine start instruction to the engine 10, the start instruction detection means to detect the fact that the engine start instruction has been issued to the engine 10 and the control means to control the compensation torque of the motor generator 24 smaller than the clutch torque calculated by the clutch torque calculation means when the engine start instruction is detected by the start instruction detection means.

Furthermore, the vehicle control apparatus according to the present invention is provided between the motor generator 24 and the vehicle wheels with the torque converter 32 having the lock-up clutch 96 arranged therein. The control means is adapted to control the lock-up clutch 96 to the slip side in a case that a difference between the compensation torque of the motor generator 24 and the clutch torque of the clutch 22 is larger than a predetermined threshold value.

Still further, the vehicle control apparatus according to the present invention is provided therein with the learning means to learn the timing and the magnitude of the rise of the clutch torque of the clutch 22. The learning means detects a degree of decrease in the rotational speed of the motor generator 24 detected by the motor rotational speed sensor 243, in response to the engagement of the clutch 22 when the clutch 22 is engaged after the start of the vehicle. The learning means is adapted to calculate the timing and the magnitude of the rise of the clutch torque of the clutch 22 based on the rotational speed of the motor generator 24 detected by the motor rotational speed sensor 243.

Figure 6B:
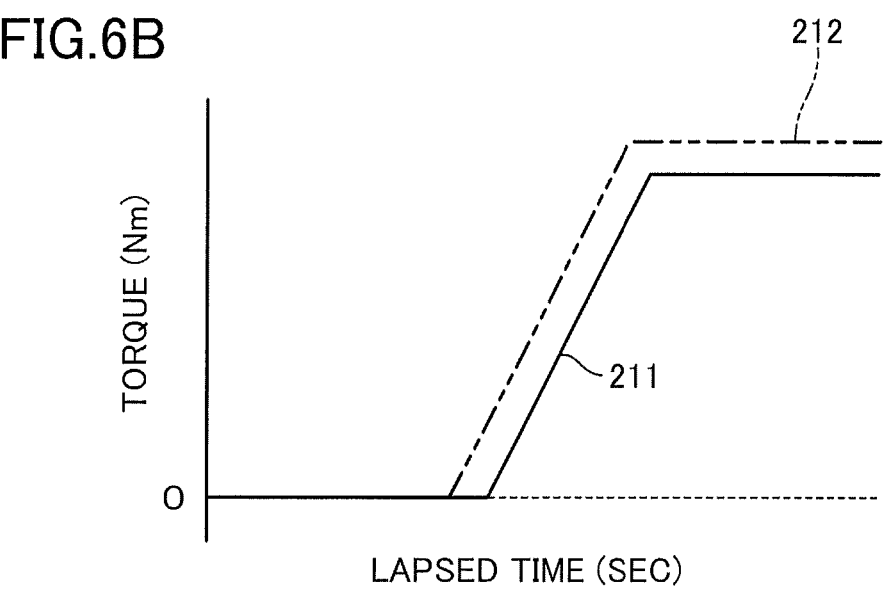
FIG. 6B shows a case in which the torque dispersion is resolved after learning of the clutch torque.

By the construction as set forth in the above definition, the learning means is adapted to resolve a dispersion range 200 as shown in FIG. 6B from the broad dispersion range 200 as shown in FIG. 6A regarding the timing and the magnitude of the rise of the clutch torque set in the clutch 22, so that the timing and the magnitude of the rise of the clutch torque of the clutch 22 is set in a single line as shown in FIG. 6B. The learning means is adapted to complete learning when the timing and the magnitude of the rise of the clutch torque of the clutch 22 is set in a single line as shown in FIG. 6B.

The control means is adapted to approach the compensation torque of the motor generator 24 to the clutch torque of the clutch 22 in accordance with the result of learning by the learning means, when the engine 10 is started by the motor generator 24.

Further, the vehicle control apparatus according to the present invention comprises a clutch engagement start time setting means that sets a time from a slip start time $T_0$ of the lock-up clutch 96 to an engagement start time $T_1$ of the clutch 22. The control means is adapted to delay the time from the slip start time of the lock-up clutch 96 $T_0$ to the engagement start time $T_1$ of the clutch 22 set by the clutch engagement start time setting means, so that the lock-up clutch 96 is controlled to the slip side after completion of the learning by the learning means.

Next, the operation of the embodiment of the vehicle control apparatus according to the present invention will be explained hereinafter.

The present embodiment is directed to a case in which the vehicle is in an EV traveling state by the motor generator 24. Accordingly, the lock-up clutch 96 is under the engaging state, and consequently the rotational speed of the motor generator 24 is equal to the rotational speed of the turbine runner 90.

Figure 5:
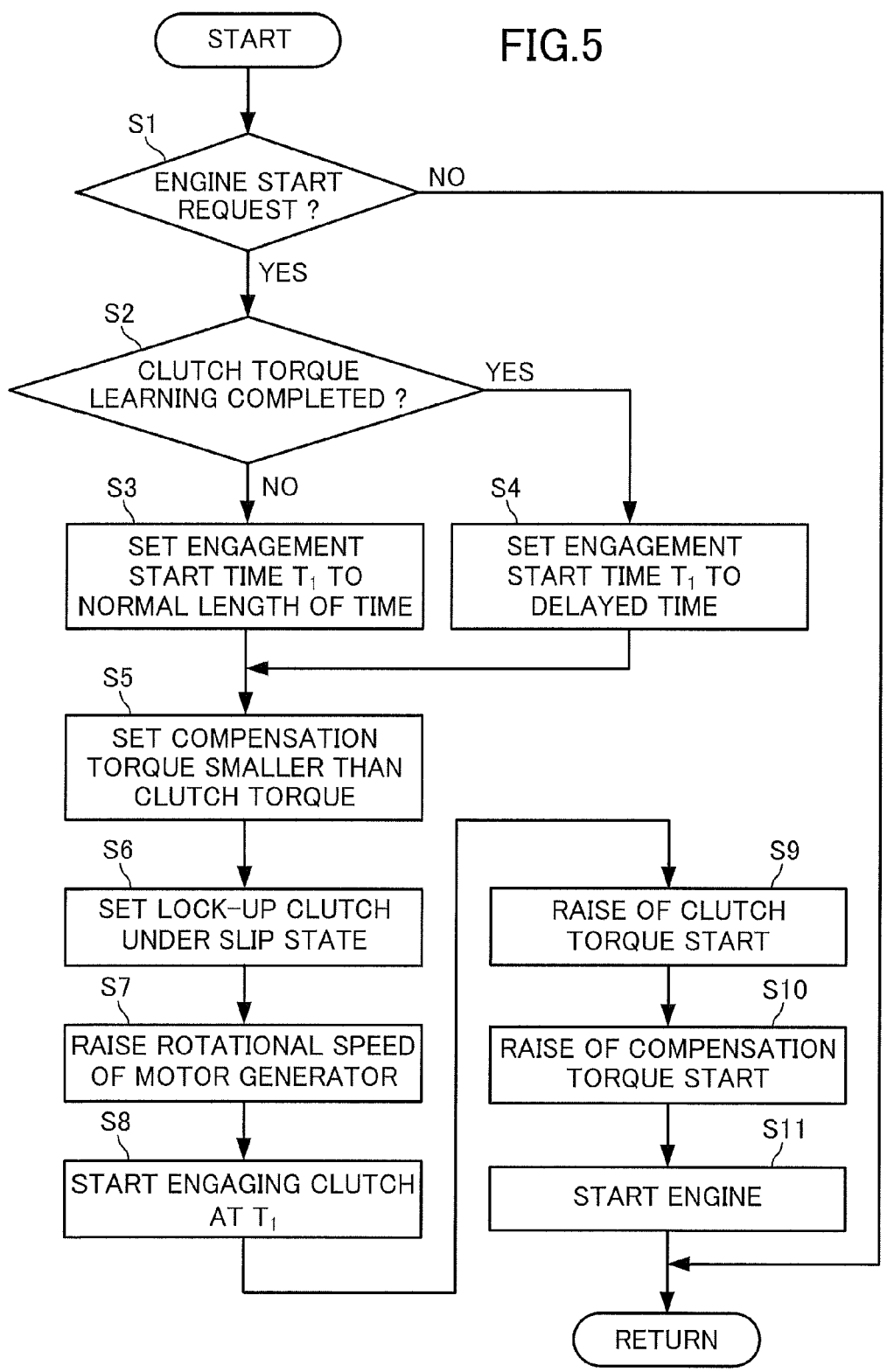
FIG. 5 is a flowchart explaining an operation of the vehicle control apparatus according to the embodiment of the present invention.

As shown in FIG. 5, The ECU 41 determines whether or not there is a start instruction of the engine 10 (Step S1). A case in which there is a start instruction of the engine 10 includes, for example, a case in which a fact that the accelerator pedal 53 is depressed is detected by the accelerator sensor 54, a case in which a fact that SOC is in short is detected by the battery ECU 44 and the like. When the ECU 41 determines that there is not a start instruction of the engine 10 (Step S1: NO), the ECU 41 returns a control to a main routine.

When the ECU 41 determines that there is the start instruction of the engine 10 (Step S1: YES), the ECU 41 determines whether or not the learning of the clutch torque is completed (Step S2). This determination is performed by the control means in the ECU 41 based on information from the learning means. When the ECU 41 determines that the learning of the clutch torque is not completed (Step S2: NO), the time from the slip start time of the lock-up clutch 96 $T_0$ to the engagement start time $T_1$ of the clutch 22 is set to a normal length of time by the clutch engagement start time setting means (Step S3).

On the other hand, when the ECU 41 determines that the learning of the clutch torque is completed (Step S2: YES), the time from the slip start time of the lock-up clutch 96 $T_0$ to the engagement start time $T_1$ of the clutch 22 is set to a delayed time longer than the normal length of time by the clutch engagement start time setting means (Step S4).

The control unit 40 sets the compensation torque of the motor generator 24 to a value smaller than the clutch torque (Step S5). To be more specific, when the learning of the clutch torque is not completed, the control unit 40 sets a rising line 201 of the compensation torque constantly slightly smaller than the dispersing range 200 of the clutch torque, as shown in FIG. 6A. By the operation as set forth above, the rising line 201 of the compensation torque is prevented from crossing with respect to a rising line 202 of the clutch torque. Here, the rising line 202 of the clutch torque as shown in FIG. 6A is one example of the rising line of the clutch torque in the dispersing range 200 of the clutch torque.

On the other hand, when the learning of the clutch torque is completed, the control unit 40 sets a rising line 211 of the compensation torque constantly slightly smaller than the rising line 212 of the clutch torque, as shown in FIG. 6B. By the operation as set forth above, the rising line 211 of the compensation torque is prevented from crossing with respect to the rising line 212 of the clutch torque.

The control unit 40 switches a flag controlling the lock-up clutch 96 to a slip state, to have the lock-up clutch 96 under the slip state (Step S6). The control unit 40 raises the rotational speed of the motor generator 24 (Step S7). The control unit 40 switches a flag controlling the clutch 22 to the engaging state at the engagement start time of the clutch 22 $T_1$ set in the step S3 or the step S4, and starts engaging the clutch 22 (Step S8). By the operation as set forth above, the rise of the clutch torque is started (Step S9).

The control unit 40 controls the motor generator 24 to raise the compensation torque of the motor generator 24 as set in the step S5 in such a manner that the rising lines 201, 211 of the compensation torque are constantly kept smaller than the rising lines 202, 212 of the clutch torque (Step S10).

As the clutch torque of the clutch 22 becomes larger, the crank shaft 11 is rotated together by the motor generator 24, so that the rotational speed of the engine 10 is raised. Thus, the engine 10 is started by push-starting (Step S11).

Figure 7:
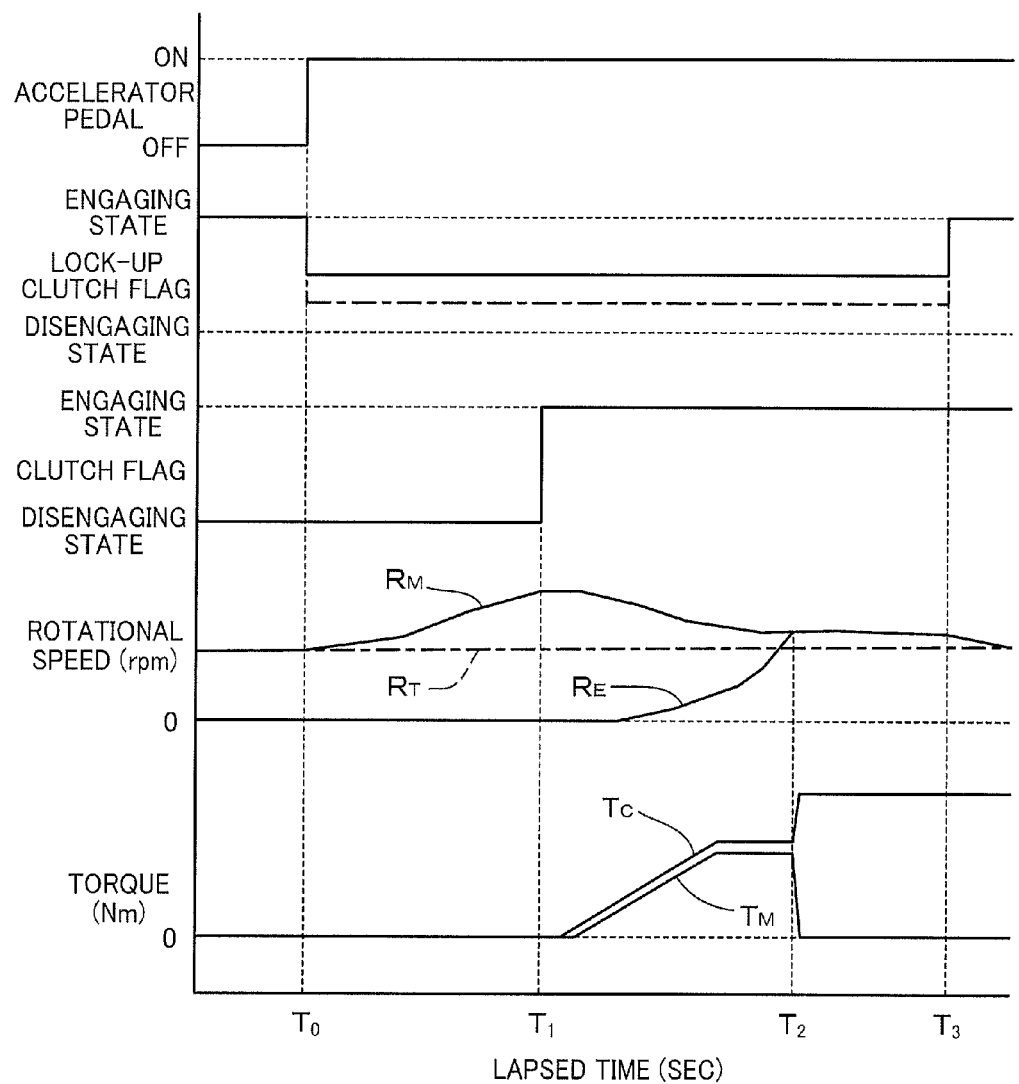
FIG. 7 a time chart showing an operation of the vehicle control apparatus according to the embodiment of the present invention, in a case that there is an engine start request, wherein rotational speed of the motor is gradually increased by delaying a time from the engine start request to a start of clutch engagement.

An operation of the vehicle when the accelerator pedal 53 is depressed by a driver during the EV traveling by the motor generator 24 as set forth above will be explained with reference to a time chart as shown in FIG. 7.

As shown in FIG. 7, during the EV traveling, the lock-up clutch 96 and the flag of the lock-up clutch 96 is in the engaging state, while the clutch 22 is in the disengaging state. The motor rotational speed $R_M$ of the motor generator 24 is equal to the turbine rotational speed $R_T$ of the turbine runner 90. The learning of the clutch torque by the ECU 41 is assumed to be completed.

At the time $T_0$, the accelerator pedal 53 is depressed by the driver of the vehicle. By this operation, engine start instruction is turned on, so that the ECU 41 switches the flag of the lock-up clutch 96 from the engaging state to the slip state. In this embodiment, the vehicle control apparatus according to the present invention is adapted to have a pressing force that controls the lock-up clutch 96, for example, released approximately by half. It is needless to say that a degree to release the lock-up clutch 96 can be appropriately set. By the operation as set forth above, the lock-up clutch 96 is switched to the slip state. Further, the control unit 40 raised the rotational speed $R_M$ of the motor generator 24.

Here, the learning of the clutch torque by the ECU 41 is completed, so that the time from the slip start time of the lock-up clutch 96 $T_0$ to the engagement start time of the clutch 22 $T_1$ is set to a delayed time longer than the normal length of time by the clutch engagement start time setting means.

There is a sufficient time from the start of the rise of the rotational speed of the motor generator 24 to the delayed time set as $T_1$, so that the rotational speed 24 $R_M$ of the motor generator becomes sufficiently large.

At the time $T_1$, the ECU 41 switches the flag of the clutch 22 from the disengaging state to the engaging state. By this operation, the clutch 22 is gradually switched to the engaging state. With the clutch 22 thus being switched, the clutch torque $T_C$ is raised. Further, the control unit 40 controls the motor generator 24, to raise the compensation torque $T_M$ of the motor generator 24 in such a manner that the compensation torque $T_M$ of the motor generator 24 is constantly slightly smaller than the clutch torque $T_C$ of the clutch 22. The clutch 22 is gradually engaged and the compensation torque $T_M$ and the clutch torque $T_C$ are raised, so that the crank shaft 11 is rotated together by the motor generator 24, thereby raising the rotational speed $R_E$ of the engine 10.

Further, with the raise of the rotational speed $R_E$ of the engine 10, load of the motor generator 24 is increased, with the result that the rotational speed $R_M$ of the motor generator 24 is decreased. However, the rotational speed $R_M$ of the motor generator 24 is sufficiently large at the time $T_1$, so that the rotational speed $R_M$ of the motor generator 24 can be secured sufficient to push-start the engine 10.

At the time $T_2$, the clutch 22 is fully engaged, so that the rotational speed $R_E$ of the engine 10 and the rotational speed $R_M$ of the motor generator 24 are equal to each other, thereby making it possible to push-start the engine 10.

At a time $T_3$ after the start of the engine 10, the ECU 41 switches the flag of the lock-up clutch 96 from the slip state to the engaging state. By this operation, the lock-up clutch 96 is switched to the engaging state, so that an output of the motor generator 24 and the engine 10 is inputted to the transmission mechanism 35 through the torque converter 32.

In a case that the hybrid vehicle stops for the purpose of parking, or the like, with the engine 10 stopped, the oil pump 34 is stopped as well. The hydraulic oil is therefore not supplied to the piston portion 80 of the clutch 22 from the oil pump 34. This results in the fact that the piston 81 is disengaged from the multiple disc portion 70 by an urging force of the return spring 83, so that the clutch 22 takes the disengaging state. At this time, the shift position of the transmitting mechanism 35 is set to be in the neutral range. In addition, the hydraulic pressure regulating valve 39 is opened.

In case that the hybrid vehicle stops for the purpose of parking, or the like, with the engine 10 stopped, the motor generator 24 is supplied with electrical power so that the engine 10 is started. The rotor 241 of the motor generator 24 is rotated by the electrical power supplied to the motor generator 24. The driving force of the rotor 241 is transmitted to the oil pump 34 through the rotor case 242, the drum 25, the sleeve 271, the clutch output shaft 270 and the torque converter 32 in this sequence.

In this case, even if the rotor case 242 is rotated, the driving force generated by the motor generator 24 is not transmitted to the engine 10, for the reason that the clutch 22 and the one-way clutch 23 take the disengaging state. Likewise, even if the transmission mechanism input shaft 33 of the transmission mechanism 35 is rotated by rotation of the torque converter 32, the output shaft 37 of the transmission mechanism 35 is not rotated for the reason that the transmitting mechanism 35 is in the neutral range.

The hydraulic oil discharged from the oil pump 34 is supplied to the clutch 22. The piston 81 slides toward the multiple disc portion 70 to depress the multiple disc portion 70 axially, thereby engaging the clutch 22. Therefore, the driving force of the rotor 241 is transmitted to the crank shaft 11 through the rotor case 242, the multiple disc portion 70, a hub portion 26 and the input portion 21 in this sequence. As a result, the engine 10 is started.

In a case that the vehicle is started after the engine 10 is started, the driving force generated by the engine 10 is transmitted to the automatic transmission 30 through the crank shaft 11, the input portion 21, the hub portion 26, the clutch 22, the rotor case 242, the drum 25, the sleeve 271 and the clutch output shaft 270 in this sequence. The oil pump 34 is driven by the driving force transmitted to the automatic transmission 30. This leads to the fact that the hydraulic oil is continuously supplied to the clutch 22, thereby ensuring the clutch 22 to be kept under the engaging state. At this time, the shift position of the transmission mechanism 35 is set to one of forward positions or a reverse position. As a consequence, the driving force of the crank shaft 11 is transmitted to the vehicle wheels from the automatic transmission 30, with the result that the hybrid vehicle is started.

In a case that the hybrid vehicle stops for the purpose of parking, or the like, with the engine 10 stopped, the hydraulic oil is not supplied to the piston portion 80 of the clutch 22 from the oil pump 34 as described above, thereby ensuring the clutch 22 to be kept under the disengaging state.

Here, in a case that the vehicle is started only by the driving force of the motor generator 24, the electric power is supplied to the motor generator 24. In response to the electric power supplied to the motor generator 24, the rotor 241 of the motor generator 24 begins to rotate. The driving force generated by the rotating rotor 241 is transmitted to the oil pump 34 through the rotor case 242, the drum 25, the clutch output shaft 270 and the torque converter 32 in this sequence.

Even if the rotor case 242 is rotated, the driving force generated by the motor generator 24 is not transmitted to the engine 10, for the reason that the clutch 22 and the one-way clutch 23 take the disengaging state. In addition, the hydraulic pressure regulating valve 39 is closed. As a result, the hydraulic oil discharged from the oil pump 34 is not supplied to the clutch 22.

The transmission mechanism input shaft 33 of the transmission mechanism 35 is rotated in response to rotation of the torque converter 32. At this time, the shift position of the transmission mechanism 35 is set to one of the forward positions or the reverse position. As a consequence, the driving force of the crank shaft 11 is transmitted to the vehicle wheels from the automatic transmission 30, with the result that the hybrid vehicle is started.

From the foregoing description, it will be understood that in the vehicle control apparatus according to the present embodiment, the rising lines 201, 211 of the compensation torque are constantly kept smaller than the rising lines 202, 212 of the clutch torque, as shown in FIG. 6A and FIG. 6B, when the engine 10 is started by the motor generator 24. By the above fact, the rising lines 201, 211 of the compensation torque are prevented from crossing with respect to the rising lines 202, 212 of the clutch torque. Therefore, the shock in the clutch of conventional vehicle control apparatuses due to the variation of torque direction at the crossing point of the clutch torque and the compensation torque can be suppressed from being generated, thereby improving the drivability of the vehicle.

Further, even in a case that there is a dispersion range 200 of the rise of the clutch torque as shown in FIG. 6A, the rising line 201 of the compensation torque is constantly kept smaller than the rising lines 202 of the clutch torque. Accordingly, the vehicle control apparatus according to the present embodiment can save an electric power consumption of the battery 47, in comparison with a conventional case in which the compensation torque is so large that rising line of the clutch torque and the rising line of the compensation torque are crossed with each other, thereby making it possible to improve the gasoline mileage of the vehicle. In addition, the vehicle control apparatus according to the present embodiment can secure the residual capacity of the battery 47, so that a region in which the hybrid vehicle can travel in the EV traveling can be increased.

Further, in the vehicle control apparatus according to the present embodiment, the ECU 41 is adapted to learn the timing and the magnitude of the rise of the clutch torque of the clutch 22. Still further, the ECU 41 is adapted to approach the compensation torque of the motor generator 24 to the clutch torque of the clutch 22 in accordance with the result of learning, when the engine 10 is started by the motor generator 24. By this operation, as shown in FIG. 6B, the vehicle in the vehicle control apparatus according to the present embodiment can approach the rising line 211 of the compensation torque to the rising line 212 of the clutch torque, so that a torque difference is minimized, thereby making it possible to suppress the shock in the clutch 22 from being generated.

The vehicle control apparatus according to the present embodiment is provided with the torque converter 32 between the motor generator 24 and the vehicle wheels, and is adapted to control the lock-up clutch 96 to the slip side when the engine 10 is started by the motor generator 24. Therefore, the shock in the clutch 22 is intercepted by the lock-up clutch 96, so that the shock in the clutch 22 is prevented from being directly transmitted to the drive shaft of the vehicle wheels, thereby making it possible to suppress the shock in the vehicle from being generated.

Particularly, as shown in FIG. 6A and FIG. 6B, when the compensation torque is constantly smaller than the clutch torque, the load of the motor generator 24 in a downstream side of the lock-up clutch 96 can be decreased by controlling the lock-up clutch to the slip side. By this operation, the compensation torque of the motor generator 24 can be better secured compared to the case that the lock-up clutch 96 is under the engaging state. Accordingly, the vehicle control apparatus according to the present embodiment can suppress the motor rotational speed from being excessively decreased due to the output torque of the motor generator 24 being absorbed by the engine 10, thereby making it possible to suppress the shock due to the absorption of the motor torque from being generated.

Further, when there is a large difference between the compensation torque and the clutch torque, a large shock is likely to be generated in the clutch 22. For this reason, the vehicle control apparatus according to the present embodiment can control the lock-up clutch 96 to the slip side, thereby making it possible to maximize a suppression effect of the shock in the vehicle, particularly when there is a large difference between the compensation torque and the clutch torque.

Further, in the vehicle control apparatus according to the present embodiment, the time from the slip start time of the lock-up clutch 96 $T_0$ to the engagement start time of the clutch 22 $T_1$ is delayed after the completion of the learning of the clutch torque (Step S4). For this reason, long time can be spent to increase the rotational speed of the motor generator 24 before the clutch 22 is engaged, so that the rotational speed of the motor generator 24 is sufficiently large at the time when the clutch 22 starts to be engaged. Therefore, even though the rotational speed of the motor generator 24 is decreased when the clutch 22 is afterwards engaged, the rotational speed of the motor generator 24 sufficient to push-start the engine 10 can be secured. For this reason, the vehicle control apparatus according to the present embodiment can suppress the motor rotational speed from being excessively reduced, so that the shock due to the absorption of the motor torque can be suppressed from being generated.

Further, in the vehicle control apparatus according to the present embodiment, the time from the slip start time $T_0$ of the lock-up clutch 96 to the engagement start time $T_1$ of the clutch 22 is delayed after the completion of the learning of the clutch torque (Step S4). For this reason, the start timing of the engagement of the clutch 22 can be easily controlled by a measurement of time, so that an increase of a load of the control unit 40 can be suppressed.

In the vehicle control apparatus according to the present embodiment as mentioned above, the time from the slip start time $T_0$ of the lock-up clutch 96 to the engagement start time $T_1$ of the clutch 22 is delayed after the completion of the learning of the clutch torque (Step S4). However, the vehicle control apparatus according to the present invention is not limited to the above mentioned operation, but in the vehicle control apparatus according to the present invention, the time from the slip start time $T_0$ to the engagement start time $T_1$ may be delayed even before the completion of the learning of the torque clutch. The vehicle control apparatus according to the present invention can increase the rotational speed of the motor generator 24, so that the motor rotational speed is suppressed from being excessively reduced, thereby making it possible to suppress the shock due to the absorption of the motor torque from being generated, in this case as well.

Figure 8:
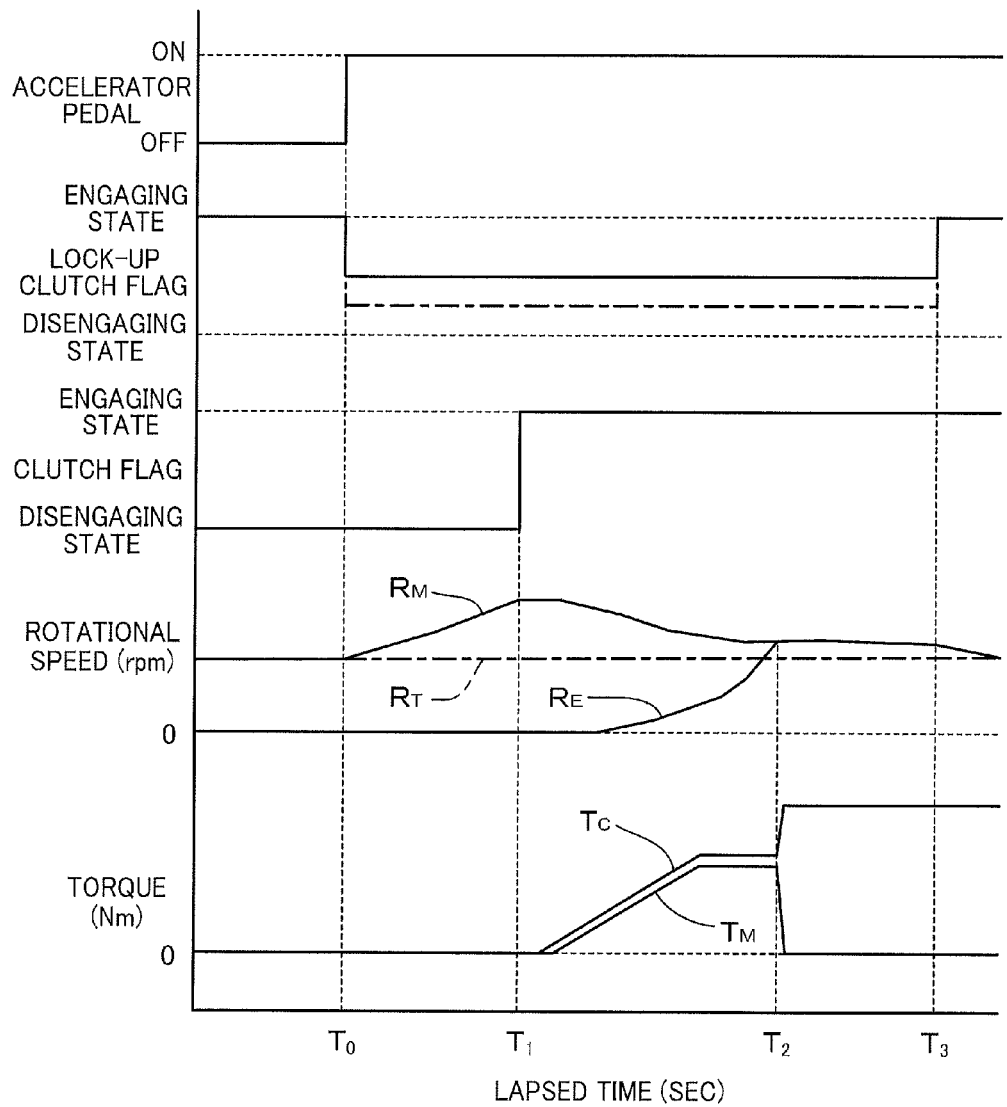
FIG. 8 a time chart showing an operation of the vehicle control apparatus according to the embodiment of the present invention, in a case that there is an engine start request, wherein rotational speed of the motor is sharply raised in a short period of time.

In the vehicle control apparatus according to the present embodiment, the time from the slip start time $T_0$ of the lock-up clutch 96 to the engagement start time $T_1$ of the clutch 22 is delayed after the completion of the learning of the clutch torque (Step S4). However, the vehicle control apparatus according to the present invention is not limited to the above mentioned operation, but the vehicle control apparatus according to the present invention may increase the rotational speed of the motor generator 24 by the start timing $T_1$ of the engagement of the clutch 22, without delaying the time from the slip start time $T_0$ to the engagement start time $T_1$. For example, as shown in FIG. 8, a large electric current can be supplied to the motor generator 24 by the motor ECU 43 from the slip start time $T_0$, so that the motor rotational speed $R_M$ is sufficiently large at the engagement start time $T_1$.

By the operation as set forth above, the motor rotational speed $R_M$ sufficient to push-start the engine 10 can be secured, even though the rotational speed of the motor generator 24 is decreased when the clutch 22 is engaged. For this reason, the vehicle control apparatus according to the present invention can suppress the motor rotational speed $R_M$ from being excessively reduced, so that the shock due to the absorption of the motor torque can be suppressed from being generated.

Further, the vehicle control apparatus according to the present embodiment is adapted to have a pressing force that controls the lock-up clutch 96, for example, released approximately by half, when the lock-up clutch 96 is switched to the slip state. However, the vehicle control apparatus according to the present invention is not limited to the above mentioned operation, but the vehicle control apparatus according to the present invention may be adapted to increase the slip amount of the lock-up clutch 96. For example, as shown by a chain line in FIG. 7 and FIG. 8, the vehicle control apparatus according to the present invention may be adapted to have a pressing force that controls the lock-up clutch 96, for example, released approximately by three fourths. It is needless to say that a degree to release the lock-up clutch 96 can be appropriately set.

By the operation as set forth above, the shock in the clutch 22 is highly intercepted in the lock-up clutch 96, so that the shock in the clutch 22 is prevented from being directly transmitted to the drive shaft of the vehicle wheels, hereby making it possible to suppress the shock in the vehicle from being generated.

Further, in the vehicle control apparatus according to the present embodiment, the engagement start timing of the clutch 22 is set based on a time control wherein the start timing of the engagement of the clutch 22 is set to the time $T_1$ a predetermined time after the slip start time $T_0$ of the lock-up clutch 96. However, the vehicle control apparatus according to the present invention is not limited to the above mentioned operation, but the vehicle control apparatus according to the present invention may be adapted, for example, to set the engagement start timing of the clutch 22 based on the rotational speed $R_M$ of the motor generator 24 detected by the motor rotational speed sensor 243.

For example, before the learning of the clutch torque, the vehicle control apparatus according to the present invention may be adapted to start the engagement of the clutch 22 in response to the motor rotational speed exceeding a slightly large rotational speed, for example, 100 rpm, in consideration of the large difference between the clutch torque and the compensation torque. Meanwhile, after the learning of the clutch torque, the difference between the compensation torque and the clutch torque is small, and consequently the vehicle control apparatus according to the present invention may be adapted to start the engagement of the clutch 22 in response to the motor rotational speed exceeding a slightly small rotational speed, for example, 50 rpm.

In this case, the engagement start timing of the clutch 22 is set based on the rotational speed $R_M$ of the motor generator 24, so that the motor rotational speed required at the engagement of the clutch 22 can be reliably secured, thereby making it possible to suppress the shock in the vehicle from being generated. Further, the motor rotational speed is not raised more than necessary, so that the gasoline mileage can be improved and a time lag until the start of the engine 10 can be shortened.

Figure 9:
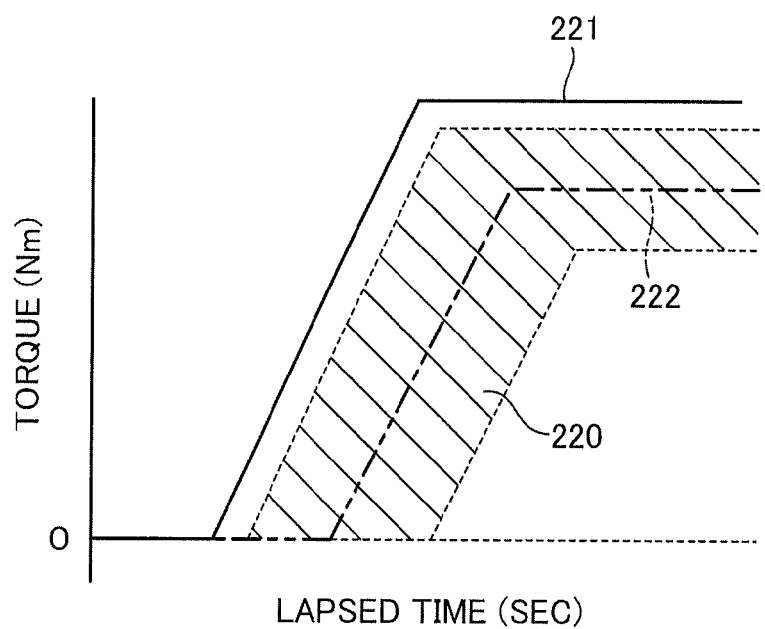
FIG. 9 is a time chart showing a variation of the torque in the vehicle control apparatus according to the embodiment of the present invention, in a case that the compensation torque of the motor is constantly larger than a dispersing range of the clutch torque.

Further, in the vehicle control apparatus according to the present embodiment, the compensation torque of the motor generator 24 is set smaller than the clutch torque. However, the vehicle control apparatus according to the present invention is not limited to the above setting, but the vehicle control apparatus according to the present invention may be adapted to set the compensation torque of the motor generator 24 larger than the clutch torque, as shown in FIG. 9. To be more specific, the control unit 40 sets the rising line 221 of the compensation torque constantly slightly larger than the dispersion range 220 of the clutch torque. By this operation, the rising line 221 of the compensation torque is prevented from being crossed with respect to the rising line 222 of the clutch torque.

Furthermore, the compensation torque is constantly kept slightly larger than the clutch torque, so that there is constantly generated in the clutch 22 a slipping from the engagement start of the clutch 22 until the full engagement of the clutch 22. Accordingly, the vehicle control apparatus according to the present invention can suppress the motor rotational speed from being excessively decreased due to the output torque of the motor generator 24 being absorbed by the engine 10, thereby making it possible to suppress the shock due to the absorption of the motor torque from being generated.

Still further, the vehicle control apparatus according to the present embodiment is applying the vehicle control apparatus to a case in which the vehicle is in the EV traveling. However, the vehicle control apparatus according to the present invention is not limited to this case, but the vehicle control apparatus according to the present invention can also be applied to a case in which the vehicle is stopping.

There has been previously described about the fact that, in the vehicle control apparatus according to the present embodiment, the clutch 22 and the one-way clutch 23 are arranged adjacent to each other inside the inner circumference of the rotor 241. However, the driving apparatus according to the present invention is not limited to have the construction as described above. The clutch 22 and the one-way clutch 23 may otherwise be arranged to overlap axially each other inside the inner circumference of the rotor 241.

As has been described above, the vehicle control apparatus according to the present invention applied to the vehicle having the clutch provided therein between the engine and the motor has an effect to suppress the shock in the clutch at the time of starting the engine by the motor, thereby improving the drivability of the vehicle, and is useful for a vehicle control apparatus of the hybrid vehicle.

EXPLANATION OF REFERENCE NUMERALS

1: driving apparatus
10: engine
20: driving unit
22: clutch
24: motor generator
30: automatic transmission
32: torque converter
34: oil pump
35: transmission mechanism
40: control unit
41: ECU
53: accelerator pedal
54: accelerator sensor
90: turbine runner
96: lock-up clutch

The invention claimed is:

1. A vehicle control apparatus comprising:
an internal combustion engine,
an electric motor connected to a plurality of vehicle wheels,
a clutch that switches a transmission state between: (i) a disengaging state, where the internal combustion engine and the electric motor are disconnected from each other, and (ii) an engaging state, where the internal combustion engine and the electric motor are connected with each other, wherein:
the internal combustion engine is started by the electric motor with the clutch being switched to the engaging state;
the electric motor has a compensation torque and the clutch has a clutch torque, the compensation torque being constantly smaller than the clutch torque when the internal combustion engine is started by the electric motor; and
the compensation torque is a torque value equal to an amount of load on the electric motor that is estimated to increase by the start of the engine, which is estimated prior to engaging the clutch.

2. The vehicle control apparatus as set forth in claim 1, further comprising a torque converter provided between the electric motor and the vehicle wheels, the torque converter having a lock-up clutch disposed within the torque converter, the vehicle control apparatus being configured to control the lock-up clutch to switch to a slip state when a difference between the compensation torque of the electric motor and the clutch torque of the clutch is greater than a predetermined threshold.

3. The vehicle control apparatus as set forth in claim 2, wherein the vehicle control apparatus is configured to control the lock-up clutch to switch to the slip state while increasing a time period from a starting time of a slip of the lock-up clutch to a starting time of an engagement of the clutch.

4. The vehicle control apparatus as set forth in claim 2, wherein the vehicle control apparatus is configured to control the lock-up clutch to switch to the slip state by increasing a slip amount of the lock-up clutch.

5. The vehicle control apparatus as set forth in claim 2, wherein the vehicle control apparatus is configured to control the lock-up clutch to switch to the slip state, in order to prevent delay in a time period from a starting time of a slip of the lock-up clutch to a starting time of the engagement of the clutch, while raising a rotational speed of the electric motor prior to the starting time of the engagement of the clutch.

6. The vehicle control apparatus as set forth in claim 1, wherein the vehicle control apparatus is configured to: (i) conduct a learning of a timing and a magnitude of a rise of the clutch torque of the clutch, and (ii) increase the compensation torque of the electric motor to the clutch torque of the clutch in accordance with a result of the learning, when the internal combustion engine is started by the electric motor.

7. A vehicle control apparatus comprising:
an internal combustion engine;
an electric motor having a compensation torque connected to a plurality of vehicle wheels;
a clutch having a clutch torque and configured to switch a transmission state between: (i) a disengaging state, where the internal combustion engine and the electric motor are disconnected from each other, and (ii) an engaging state, where the internal combustion engine and the electric motor are connected with each other, and the electric motor are connected with each other, the clutch being set at the engaging state in response to the electric motor starting the internal combustion engine; and
an electronic control unit programmed to maintain the compensation torque smaller than the clutch torque when the internal combustion engine is started by the electric motor, wherein
the compensation torque is a torque value equal to an amount of load on the electric motor that is estimated to increase by the start of the engine, which is estimated prior to engaging the clutch.

* * * * *